United States Patent [19]

Manning

[11] Patent Number: 4,579,367
[45] Date of Patent: Apr. 1, 1986

[54] BUMPER SUPPORT AND SUSPENSION SYSTEM

[76] Inventor: Donald L. Manning, 4002 Normanwood Dr., Orchard Lake, Mich. 48033

[21] Appl. No.: 645,431

[22] Filed: Aug. 29, 1984

[51] Int. Cl.⁴ .............................................. B62D 21/00
[52] U.S. Cl. .................................. 280/784; 280/688; 293/102; 293/129
[58] Field of Search ............... 280/670, 500, 781, 783, 280/784; 293/1, 102, 129, 130, 132

[56] References Cited

U.S. PATENT DOCUMENTS

| | | | |
|---|---|---|---|
| 3,173,670 | 3/1965 | Hornsby | 280/670 |
| 3,977,489 | 8/1976 | Cole et al. | 280/670 |
| 4,327,938 | 5/1982 | Geissler et al. | 280/784 |
| 4,440,435 | 4/1984 | Norlin | 280/784 |

Primary Examiner—Richard A. Bertsch

[57] ABSTRACT

The invention relates to a bumper support system for use with heavy-duty vehicles such as buses and wherein either towing or front end collision loads are transmitted through a pair of brace members in such a way as to minimize damage to the vehicle body and front suspension.

4 Claims, 3 Drawing Figures

BUMPER SUPPORT AND SUSPENSION SYSTEM

TECHNICAL FIELD

The invention relates to a bumper support and suspension system particularly for use with heavy duty vehicles such as buses and particularly such vehicles wherein the driver's seat and a front passenger entrance or door are generally transversely aligned and disposed forwardly of the steerable wheels of the vehicle. It is a particular object of the present invention to provide a bumper support system such that loads induced through the bumper, either through towing or a front end collision, are absorbed or transferred in a manner such as to prevent or minimize damage to the vehicle body and the front suspension. In an effort to reduce weight and thereby improve the operating economies of vehicles such as buses, it has become desirable to shorten bus or vehicle length and to otherwise use lighter weight body constructions. Thus, in some respects the newer, lighter weight type buses are more susceptible to damage than was the case with the older, larger type buses.

BACKGROUND OF THE INVENTION

In order to achieve a substantially lighter weight bus-type vehicle, applicant utilizes a generally monocoque type body construction wherein the bus body components are integrated in such a way as to distribute loads throughout the body construction as opposed to earlier designs where a heavy duty frame or chassis is the main load carrying portion of a vehicle. Applicant's vehicle construction is generally modular in nature. In the present vehicle design the longitudinally frontmost module of the body projects forwardly of the steerable front wheels and contains the front door, the driver's seat or position and, in certain cases, an extendible passenger loading ramp such as shown in applicant's U.S. Pat. No. 4,131,209.

There are generally two operating conditions under which the forwardly projecting body module can be damaged and, at least in one case, cause damage to the front suspension which supports the steerable wheels. The present invention includes an energy absorbing brace system which coacts with the vehicle underbody in a way to transmit and/or absorb bumper induced loads so as to minimize damage to the vehicle body and front suspension.

A first mode in which damage can occur to a vehicle having a projecting front end is when the vehicle is being towed. Frequently, the vehicle bumper is secured directly to the vehicle body in such a way as to transmit the towing loads directly through the relatively lightweight body structure. In such cases the towing loads, in many instances, have been sufficiently high as to either severely distort or to completely sever the projecting front module from the remainder of the vehicle. Another source of vehicle damage can occur during a front end collision wherein the overhanging or projecting front end module collapses sufficiently to damage the front suspension which supports the steerable wheels. In the present invention, applicant has developed a bracing arrangement associated with the forwardly projecting module which supports the front bumper in a way as to transmit towing loads to the vehicle underbody and the front suspension in a way as to prevent damage to the vehicle body and, at the same time, absorbs the energy of a front end collision in such a way as to minimize damage to the vehicle body and front suspension.

More specifically, the bumper support and suspension system of the present invention includes an underbody extending substantially throughout the length and width of said main body and includes a first transverse beam or support member disposed forwardly of the driver position and front door, a second transverse beam disposed immediately rearwardly of the driver position and a third transverse beam spaced rearwardly of said second beam. The transverse beams or members longitudinally define the aforementioned modules. The system also includes a steerable wheel-supporting subframe articulated at its longitudinally forward end to the second transverse beam and having a longitudinally rear portion which is disposed proximate the third transverse beam. Spring means are disposed between the rear portion of the subframe and the third transverse beam to permit the underbody to move vertically relative to the subframe. The system also includes a pair of energy absorbing and transmitting brace elements the respective rear ends of which are fixed to the transverse mid-portion of the second transverse beam. The brace elements forwardly diverge transversely outwardly relative to their respective rear ends and are attached to the first transverse beam or support member. The forward ends of the brace elements project longitudinally beyond the first transverse beam and are adapted to support thereon a front bumper member.

Thus, during towing the towing loads are transmitted through the brace elements to that portion of the underbody to which the front suspension or subframe is secured whereby the towing loads are carried by the underbody and subframe. In the case of a front end collision, the diverging brace elements will deflect or bow outwardly to absorb a portion of the energy of the collision impact and a portion of which load will also be absorbed by the transverse underbody beam to which the subframe is articulated.

Articulated subframes supporting steerable wheels are shown in the following U.S. patents: U.S. Pat. No. 1,479,187 Lansden; U.S. Pat. No. 3,768,825 Magnusson; and U.S. Pat. No. 4,248,455 Manning. None of these references discloses the use of energy absorbing and transmitting brace elements disposed forwardly of the articulated subframes. Thus, in the case of Lansden and Magnusson a front end collision would transmit the impact thereof directly to the wheel supporting subframe causing the latter to be damaged. In the case of Manning, towing loads would be carried by the overhanging or projecting forward portion of the vehicle thereby subjecting the latter to distortion or other possible damage. Without such energy absorbing brace elements forward of the front end suspension, the prior art systems cannot prevent damage to the vehicle body or front suspension under towing and front end collision conditions.

Various other advantages are achieved with applicant's invention which is shown in the drawings and hereinafter described in detail.

BEST MODE FOR CARRYING OUT THE INVENTION

Figure 1:
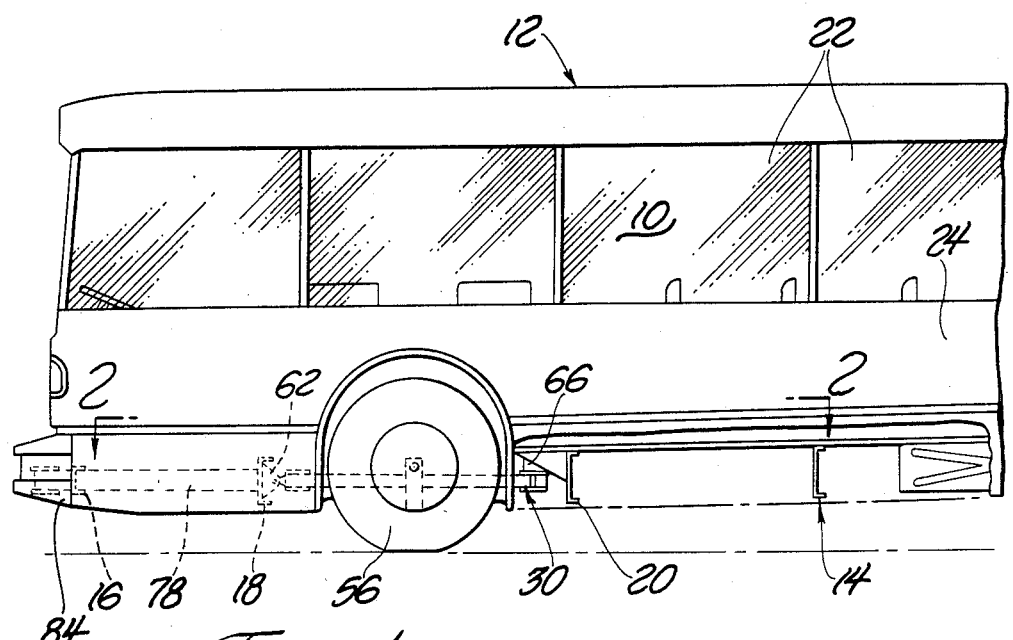
FIG. 1 is a partially broken away, side elevational view of the front end of the vehicle embodying applicant's suspension and bumper support system.
Figure 2:
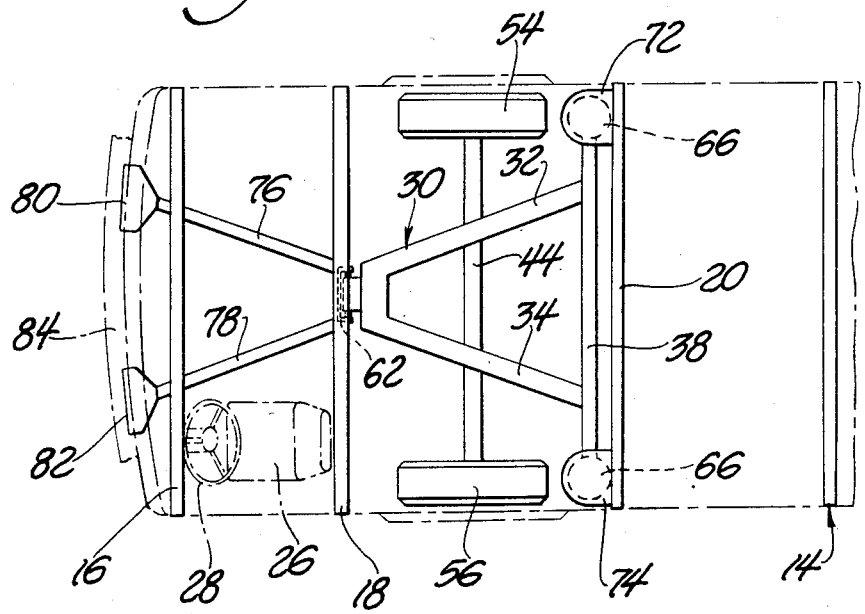
FIG. 2 is a plan view of the articulated steering wheel support subframe, associated underbody beams and the forwardly disposed bumper supporting brace elements.

Referring particularly to FIGS. 1 and 2 of the drawings, a bus is generally indicated at 10. The bus is of a monocoque construction and comprises an upper body portion indicated generally at 12 and an underbody indicated generally at 14. Upper body 12 is comprised of longitudinally spaced modules formed by tubular structures, not shown, the lower ends of which are integrally secured to a plurality of transverse beams such as 16, 18 and 20 which form a portion of the underbody 14. Windows 22 and an outer unstressed skin 24 are suitably secured to the tubular frame structure to provide the outer surface of the vehicle body. In thus integrally joining the tubular frame to the transverse beams of the underbody 14, a unitized or monocoque body is formed which eliminates the need for the typical heavy-duty vehicle frame or chassis and enables lightening of the body structure.

The longitudinally frontmost portion or module of the vehicle is generally disposed between transverse beams 16 and 18 and on the left side thereof contains the operator's seat 26 and steering wheel member 28 while the passenger entrance and exit door, not shown, would be transversely aligned therewith on the right-hand side of the vehicle.

Figure 3:
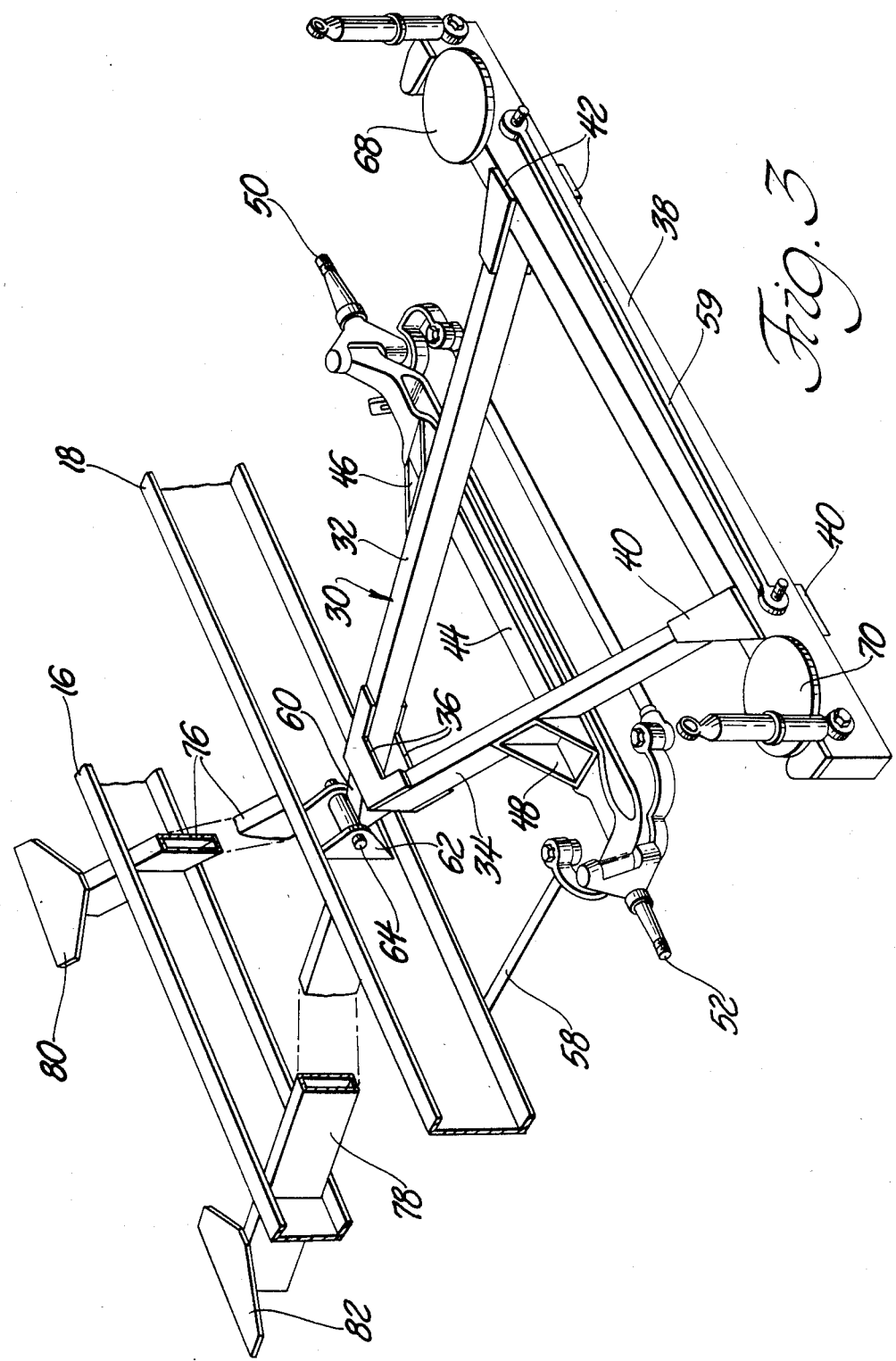
FIG. 3 is a detailed perspective view of the articulated subframe and bumper supporting brace elements.

As best seen in FIGS. 2 and 3, a steering wheel-supporting subframe is indicated generally at 30. Subframe 30 comprises a pair of rearwardly diverging side frame elements 32 and 34 which converge and are joined at their forward end through suitable welded plates 36. The rear end of the subframe includes a first cross member 38 suitably fixed as through welded plates 40 and 42 to the diverging side frame members 32 and 34. A second cross beam member 44 is secured through bracket elements 46 and 48 to the side frame members 32 and 34 generally intermediate the convergent and divergent ends thereof. Suitable dirigible or steerable axle members 50 and 52 are secured to the transverse outer ends of second cross beam member 44 and, in turn, are adapted to rotatably support the front wheels 54 and 56 thereupon. A suitable steering linkage mechanism 58 is connected to the driver operated steering wheel member 28 to permit steering of the vehicle.

A Panhard rod 59 is pivotally secured at its respective ends to subframe 30 and underbody 14 to prevent the subframe from any appreciable lateral movement relative to the underbody.

The front end of subframe 30 is articulated to the second transverse underbody beam 18 through an apex member 60 secured to the convergent end of the subframe, a beam bracket 62 and a suitable pin member 64. Bracket 62 is secured, as by welding, to the transverse mid-portion of beam 18.

Spring means 66, such as pneumatic air bags, are supported upon subframe cross member 38 by suitable plate elements 68 and 70 disposed transversely outwardly of the side frame members 32 and 34 and generally in longitudinal alignment with the steerable wheels 54 and 56. The upper ends of the spring elements are similarly supported or contained by vertically spaced plate elements 72 and 74 fixed to the upper portion of transverse beam 20. Thus, the spring elements 66 allow the subframe 30 to articulate about pin 64 whereby the vehicle body 12-14 may move vertically relative to the subframe. By using pneumatic air bags as the vehicle springing means, the operator also may raise and lower the front end of the vehicle to facilitate passenger ingress and egress particularly where an extendible passenger ramp is provided as shown in applicant's U.S. Pat. No. 4,131,209.

Again as best seen in FIGS. 2 and 3, a pair of brace elements are indicated at 76 and 78. The rear ends of the brace elements are secured to transverse beam 18 through suitable brackets and bolts or, preferably, by welding. As with subframe supporting bracket 62, the rear ends of brace elements 76 and 78 are secured at the mid-portion area of transverse beam 18. The brace elements forwardly diverge transversely outwardly from their rear ends and are secured, as by tack welding, to the forwardmost transverse beam or support member 16. Transverse beam 16 is suitably slotted to allow the forward ends of brace elements 76 and 78 project forwardly beyond the beam. Suitable bracket members 80 and 82 are secured to the forward ends of brace elements 76 and 78 and, in turn, are adapted to support front bumper member 84 thereupon.

As noted, brace elements 76 and 78 are tack or lightly welded to the front transverse beam or support member 16 to provide vertical support to the front ends of the elements and bumper 84. However, during a sufficiently severe front end collision the weldments can break thereby allowing the elements to bow or bend outwardly.

Thus, any longitudinal loads imposed through bumper 84 will be absorbed or transmitted through brace elements 76 and 78 to the vehicle underbody rather than by the upper vehicle body. In the case of a front end collision, and because of their forwardly diverging orientation, brace elements 76 and 78 will initially bow or bend outwardly to absorb the impact energy.

Other modifications or variations of applicant's energy absorbing and transmitting system are possible within the intended scope of the invention as set forth in the hereinafter appended claims.

What is claimed is:

1. A bumper support and suspension system for a vehicle of the type wherein the driver's position and a front door are generally transversely aligned at the front end of the vehicle main body and the steerable front wheels are disposed on the body immediately rearwardly of the driver position and front door, said suspension system comprising:
   an underbody (14) extending substantially throughout the length and width of said main body, said underbody including
   a first transverse beam (16) disposed forwardly of the driver position and front door,
   a second transverse beam (18) disposed immediately rearwardly of the driver position,
   a third transverse beam (20) spaced rearwardly of said second beam;
   a steerable, wheel-supporting subframe (30), means articulating the subframe at its longitudinally forward end to the second transverse beam (18), the longitudinally rear portion of the subframe being disposed proximate the third transverse beam (20),
   spring means (66) being disposed between the rear portion of the subframe and the third transverse beam to permit the underbody to move vertically relative to the subframe, a pair of linear brace elements (76 and 78) the respective rear ends of which are fixed to the transverse mid-portion of the second transverse beam (18), the brace elements diverging transversely outwardly relative to their respective rear ends and being secured to the first transverse beam (16), the forward ends of the brace elements projecting longitudinally beyond the first transverse beam (16), and
a bumper (84) fixed to the forwardly projecting ends of the brace elements.

2. A bumper support and suspension system as set forth in claim 1 wherein the subframe articulating means includes a bracket (62) fixed to the transverse mid-portion of the second transverse beam (18), the rear ends of the brace elements (76 and 78) being fixed to said second transverse beam generally opposite said bracket.

3. A bumper support and suspension system for a vehicle of the type wherein the driver's position and a front door are generally transversely aligned at the front end of the vehicle main body and the steerable front wheels are disposed on the body immediately rearwardly of the driver position and front door, said suspension system comprising:
an underbody (14) extending substantially throughout the length and width of said main body, said underbody including
a first transverse beam (16) disposed forwardly of the driver position and front door,
a second transverse beam (18) disposed immediately rearwardly of the driver position,
a third transverse beam (20) spaced rearwardly of said second beam;
a generally A-shaped subframe (30) including
a pair of rearwardly diverging side frame members (32 and 34) connected at their forward ends to form a convergent end,
a pivot member (60) disposed at the convergent end of said side frames,
a rearwardly facing bracket member (62) fixed to the second transverse beam member (18) generally at its transverse midpoint and a pin element (64) pivotally connecting the subframe pivot member (60) and the bracket member,
a first cross member (38) fixed to the side frame members (32 and 34) and disposed adjacent said third transverse beam (20),
spring means (66) mounted between the first cross member (38) and the third transverse beam (20) to permit the underbody to move vertically relative to the subframe,
a second cross member (44) fixed to the side frame members (32 and 34) and disposed longitudinally intermediate the convergent end of the subframe and the first cross member (38),
dirigible wheel-supporting axles (50 and 52) mounted on the respective outer ends of the second cross member (44);
a pair of brace elements (76 and 78) disposed between the first and second transverse beams (16 and 18), the longitudinally rear end of said elements being fixed to said second transverse beam oppositely proximate the bracket member (62), the brace elements diverging transversely outwardly relative to their respective rear ends and being fixed to the first transverse beam (16), the longitudinally forward ends of the beam elements projecting beyond the first transverse beam, and a bumper (84) fixed to the longitudinally forwardly projecting ends of the brace elements.

4. A bumper support and suspension system as set forth in claim 3 wherein the first transverse beam (16) is comprised of a pair of vertically spaced tubular elements between which the brace elements (76 and 78) forwardly project.

* * * * *